United States Patent [19]
Adams et al.

[11] 3,861,242
[45] Jan. 21, 1975

[54] COMPOSITE GEAR STRUCTURE

[75] Inventors: Otis J. Adams; Osborne C. Dodson, both of Chagrin Falls; Merritt A. Osborn, Chesterland, all of Ohio

[73] Assignee: Esco Manufacturing Company, Chagrin Falls, Ohio

[22] Filed: Nov. 7, 1973

[21] Appl. No.: 413,618

[52] U.S. Cl. .............................................. 74/750 R
[51] Int. Cl. ............................................... F16h 3/52
[58] Field of Search ............... 74/750 R, 640, 217 C

[56] References Cited
UNITED STATES PATENTS
1,695,214  12/1928  Sörensen .......................... 74/750 R

*Primary Examiner*—Leonard H. Gerin
*Attorney, Agent, or Firm*—William N. Hogg, Esq.

[57] ABSTRACT

The present invention relates to composite reduction gear structures formed from sprocket and chain units. The composite gear includes a hub journalled on an eccentric which is mounted on a shaft. The hub has first and second axially spaced sprockets. A third sprocket is nonrotatably mounted adjacent the first sprocket and a fourth sprocket is journalled for rotation adjacent the second sprocket. A first link chain drivingly interconnects the first and third sprockets and a second link chain drivingly interconnects the second and fourth sprockets, whereby rotation of the shaft carrying the eccentric is translated to a speed reduced torque augmented output from the fourth sprocket.

6 Claims, 3 Drawing Figures

PATENTED JAN 21 1975
3,861,242
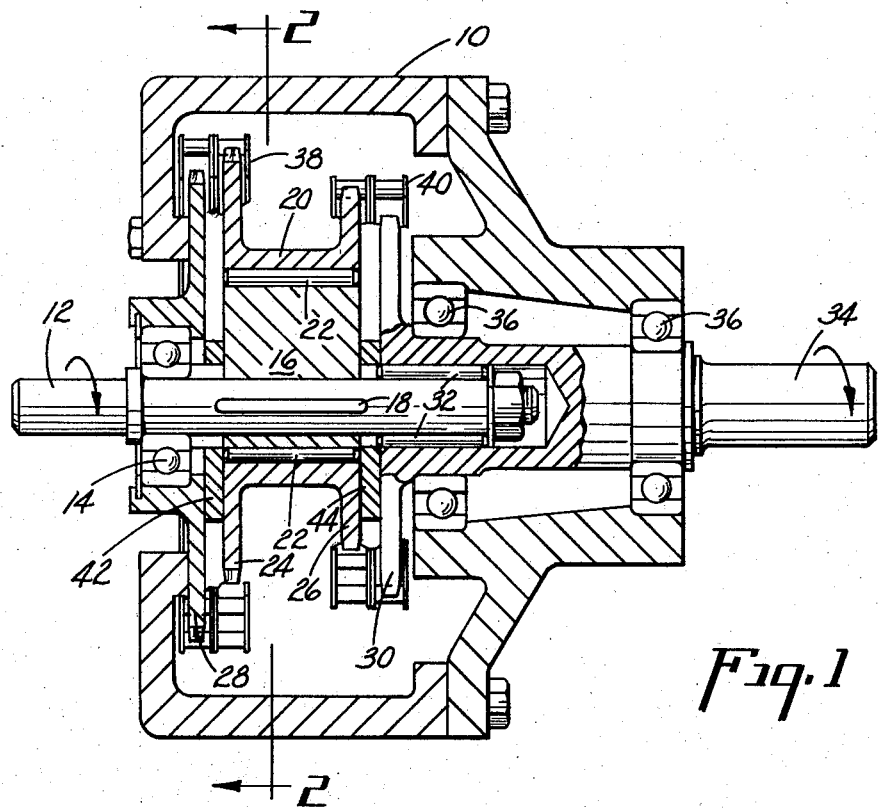
Fig.1
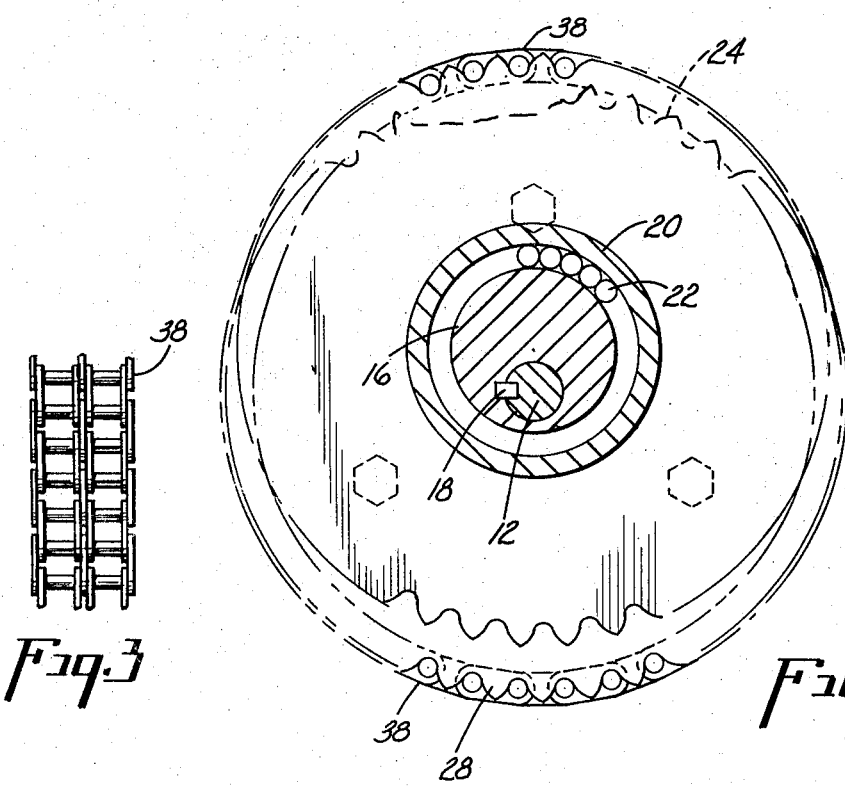
Fig.3
Fig.2

COMPOSITE GEAR STRUCTURE

BACKGROUND OF THE INVENTION

This invention relates generally to reduction gear structures, and more particularly to composite reduction gear structures formed from sprocket and chain units.

Reduction gearing units have taken many different forms, the most common being the gear units employing meshing or engaging gear teeth in various configurations.

While this type of gearing structure has become quite highly developed, it nevertheless has certain inherent limitations.

Also, there has been developed to a certain extent chain and sprocket type gear reduction drive, but these also have had inherent limitations which have prevented their being developed to their fullest extent. For example, see U.S. Pat. Nos. 1,556,399 and 3,151,495.

SUMMARY OF THE PRESENT INVENTION

According to the present invention, a novel composite reduction gear structure is provided utilizing chain and sprocket construction which provides many features superior to those attainable in either the conventional meshing gear construction or a conventional chain and sprocket type design and which overcomes many of the deficiencies and drawbacks of both of these prior art types.

DESCRIPTION OF THE DRAWING

FIG. 1 is a longitudinal sectional view of the preferred embodiment of a composite reduction gear structure according to this invention;

FIG. 2 is a sectional view taken substantially along the plane designated by the line 2—2 of FIG. 1; and FIG. 3 is an elevational view of a section of an endless chain member utilized in the composite gear structure.

DESCRIPTION OF THE PREFERRED EMBODIMENT

Referring now to the drawing, a preferred embodiment of a composite reduction gearing structure according to the present invention is shown. The device includes a housing member 10 which has an input shaft member 12 extending through one end thereof which shaft is supported by a bearing 14. An eccentric or cam 16 is keyed to the shaft 12 by means of a key 18. The input shaft 12 is rotatable by means of a power source (not shown) and the eccentric or cam 16 rotates therewith.

A hub member 20 is journalled on the eccentric 16 by means of roller bearings 22. The hub 20 is formed with a first toothed wheel or sprocket 24 and a second toothed wheel or sprocket 26 which are in axially spaced relationship with respect to each other. A third sprocket wheel 28 is located adjacent the sprocket wheel 24 axially spaced therefrom and secured to the housing 10 so that it is essentially non-rotative or fixed with respect thereto.

A fourth sprocket member 30 is provided adjacent the second sprocket wheel 26, axially spaced therefrom, and journalled on housing 10 by bearings 36. The sprocket member 30 also is carried on the input shaft 12 by the roller bearings 32. Extending from the fourth sprocket 30 is an output shaft 34 which extends through the opposite side of the housing 10 from that of the input shaft 12 and is co-axial therewith.

A first endless drive chain member 38, a section of which is shown in FIG. 3, is reaved around the first and third sprockets 24 and 28. The chain member 28 is formed with two strands or bands of links, one of which drivingly engages the sprocket wheel 24, the other of which drivingly engages the sprocket wheel 28, thus forming a driving engagement therebetween. A second endless drive chain member 40 is provided, which also has two separate strands of links, which chain is reaved around the sprocket 26 and the sprocket 30 and drivingly engaged therewith forming a driving connection therebetween.

Because of the nature of construction of the eccentric 16 and hub 20, it is normally required that some type of counter-balancing be provided; and for such purpose a pair of counterweights 42 and 44 are provided which extend in the opposite direction of the throw of the eccentric or cam 16 thus balancing the shaft. This positioning of the counterweights adjacent either end of the eccentric and between the sprockets engaged by their common chain enables a straight-through drive to be obtained.

In the arrangement shown in FIGS. 1 and 2, the number of teeth on the sprocket wheel 24 is less than the number of teeth on the sprocket wheel 28 and likewise the number of teeth on the sprocket wheel 26 is less than the number of teeth on the sprocket wheel 30. It has also been found, for reasons to be described later, that the difference in the number of teeth between the sprocket wheels 24 and 28 must be the same as the difference in number of teeth between the sprocket wheel 26 and 30; i.e., if the sprocket wheel 24 had two less teeth than the sprocket wheel 28, then the sprocket wheel 26 must have two less teeth than the sprocket wheel 30. (However, the sprocket wheel 28 need not have the same number of teeth as the sprocket wheel 30, and indeed, normally they will not.) The amount of reduction obtained will depend on this difference in number of teeth between two pairs of sprocket wheels, the lower the difference the greater the reduction with the maximum reduction being obtainable with a one tooth differential.

The endless chains 38 and 40 can be either referred to as a snug chain configuration or a loose chain configuration. In the snug chain configuration the endless chain will have the same number of links as the number of teeth in the largest sprocket wheel that it engages; i.e., the chain 38 has the same number of links as the number of teeth in the sprocket wheel 26 and the chain 40 will have the same number of links as the number of teeth in the sprocket wheel 30. This type of arrangement is described in U.S. Pat. No. 3,151,495. In the loose link configuration each of the endless chains will have at least one more link than the number of teeth in the largest sprocket wheel which it engages; i.e., the chain 38 will have at least one more link than the number of teeth in the sprocket wheel 28 and the endless chain 40 will have at least one more link than the number of teeth in the sprocket wheel 30. A loose type chain configuration is described in U.S. Pat. No. 1,556,399.

In the embodiment depicted in FIGS. 1 and 2, the loose link configuration of the chain is employed, with each of the chains 38 and 40 having two more links than the number of teeth in the sprocket wheels 28 and 30 respectively. In most cases the loose link configuration is preferred where a very high reduction is desired, this high reduction being obtainable by a small difference in number of teeth between the sprocket wheels 24 and 28 and the sprocket wheels 26 and 30. It has been found that with a loose link configuration it is possible to have a one or two tooth differential between the respective sprocket wheels 24 and 28 on one hand, the sprocket wheels 26 and 30 on the other, and still maintain adequate and proper driving engagement between the teeth on the sprocket wheels and the links of the chain, without tooth/chain interference in disengagement of the smaller sprocket. In the preferred embodiment a two tooth differential is shown. One of the advantages of the loose link configuration is that this configuration allows the "wrap" of the chain to be maximized on each sprocket pair, i.e., a maximum number of teeth are engaged at any given time. This minimizes skewing of the chain, thus reducing wear and distortion of the chain.

If a snug chain configuration is employed it has been found that there has to be at least a three tooth differential when conventional sprocket teeth are used between the corresponding sprocket pairs to allow for the teeth to properly engage and disengage. Thus there is some limitation as to the maximum reduction that can be obtained, this being limited to that obtainable with a three or more tooth differential between the corresponding sprocket pairs. However, in some instances it may be desirable to use a snug chain construction as explained above, in which case such a construction can be utilized if there is a sufficient differential between the number of teeth and number of chain links.

As indicated above, in both the loose chain and the tight chain configuration, it has been found that the tooth differential between the sprocket wheels 24 and 28 on one hand and 26 and 30 on the other must be the same; i.e., if there is a one tooth differential between the number of teeth on the sprocket wheel 24 and 28, there must be a one tooth differential between the number of teeth on the sprocket wheel 26 and 30, if there is a two tooth differential between the number of teeth on the sprocket wheel 24 and the sprocket wheel 28, there must be a two tooth difference between the teeth on the sprocket wheel 26 and the sprocket wheel 30, etc. The reason for this is as follows: In the case of the tight chain configuration it has been found that if these teeth differentials are not the same, then the teeth on all four sprockets will not properly mesh with the links on all four strands of the chain and the device simply will not operate. In the case of the loose chain configuration, if the tooth differential is not the same there will be an undesirable amount of slack in one endless chain which will cause excessive wear on sprocket wheels and/or chain and even can result in an inoperative configuration. Therefore, it is absolutely essential in both the tight chain configuration and the loose chain configuration that the difference in the number of teeth between the sprocket wheel 24 and the sprocket wheel 28 be exactly the same as the difference in number of teeth between the sprocket wheel 26 and 30 to provide a properly operative unit.

Basically, the present composite gear, by utilizing an eccentrically mounted hub having sprocket wheels with drive chain engaged therewith and drivingly engaging additional sprockets and by having equal tooth differentials between certain sprocket wheels provide a composite gear structure in which very high reductions in speed with high torque multiplication can be achieved with co-axial input and output shafts in a highly efficient, highly effective, relatively inexpensive manner.

What is claimed is:

1. A composite gear assembly comprising, an input shaft and means to rotate said input shaft, an eccentric mounted on said input shaft to rotate therewith, a unitary hub member mounted for rotation on said eccentric and having first and second axially spaced toothed sprocket wheels, a third sprocket wheel axially spaced from and adjacent to said first sprocket wheel and means to restrain said third sprocket wheel from rotation, a fourth sprocket wheel journalled for rotation concentrically with said input shaft axially spaced from and adjacent to said second sprocket wheel and having an output shaft, said first sprocket wheel having a lesser number of teeth than the third sprocket wheel and said second sprocket wheel having a lesser number of teeth than said fourth sprocket wheel, the difference in the number of teeth between said first and third sprocket wheels being the same as the difference in number of teeth as between the second and fourth sprocket wheels., first endless drive link chain means drivingly interconnecting said first and third sprocket wheels and second endless device chain means drivingly interconnecting said second and fourth sprocket wheels, whereby rotation of the input shaft is translated to a speed reduced torque augmented output of said output shaft.

2. The invention as defined in claim 1 wherein the first chain member has a greater number of links than the number of teeth on the third sprocket wheel.

3. The invention as defined in claim 1 wherein the second chain member has a greater number of links than the number of teeth on the fourth sprocket wheel.

4. The invention as defined in claim 1 wherein said first chain member has the same number of links as the number of teeth in the third sprocket wheel.

5. The invention as defined in claim 1 wherein the second chain member has the same number of links as the number of teeth in the fourth sprocket wheel.

6. The invention as defined in claim 1 wherein said fourth sprocket wheel is carried on said input shaft.

* * * * *